Nov. 10, 1970   C. J. GRUNDMEYER   3,538,794
PORTABLE TOOL ATTACHMENT
Filed April 5, 1968   2 Sheets-Sheet 1
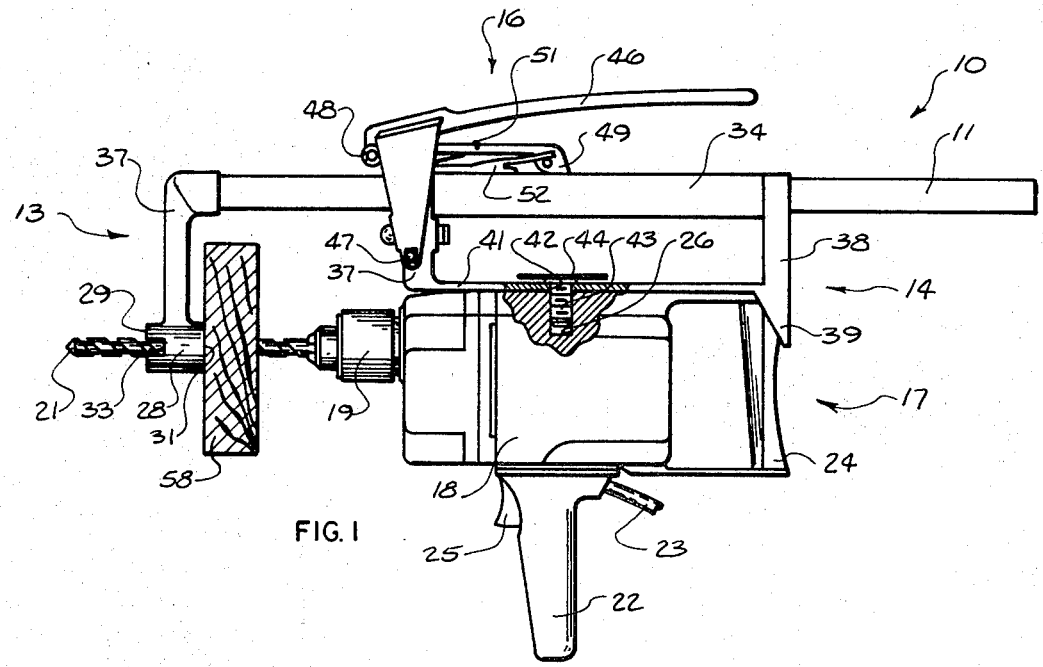
FIG. 1
FIG. 2
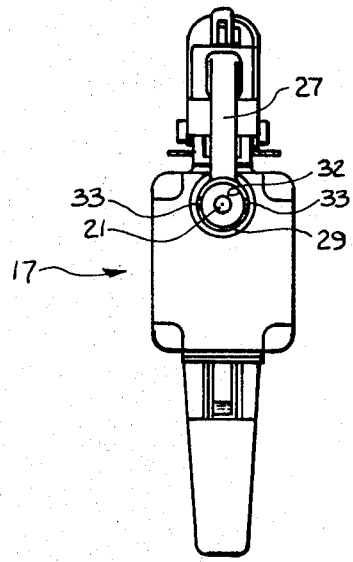
FIG. 3
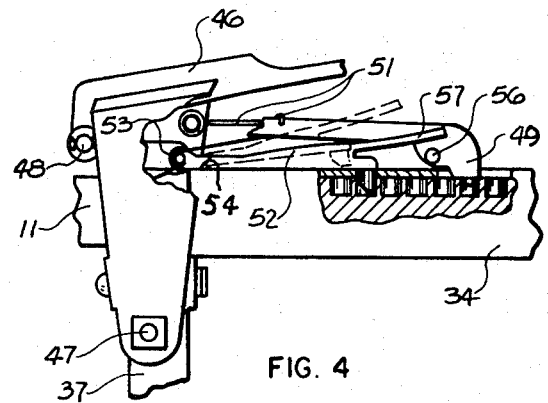
FIG. 4
INVENTOR
CONRAD J. GRUNDMEYER
BY
*Henderson & Strom*
ATTORNEYS Nov. 10, 1970   C. J. GRUNDMEYER   3,538,794
PORTABLE TOOL ATTACHMENT Filed April 5, 1968   2 Sheets-Sheet 2

INVENTOR
CONRAD J. GRUNDMEYER
BY
ATTORNEYS

United States Patent Office 3,538,794
Patented Nov. 10, 1970

3,538,794
PORTABLE TOOL ATTACHMENT
Conrad J. Grundmeyer, Strawberry Point, Iowa, assignor of one-fourth to Leonard W. Sandman, Omaha, Nebr.
Filed Apr. 5, 1968, Ser. No. 719,204
Int. Cl. B23b 45/14, 47/00
U.S. Cl. 77—55                 9 Claims

ABSTRACT OF THE DISCLOSURE

This invention relates to a portable tool attachment which is adapted to feed a drill bit or the like into a workpiece by either pulling or pushing a tool thereto; the apparatus having a feed bar, an arm element secured to one end of the bar and having a guide block member disposed thereon, a frame slidably mounted on the bar and adapted to hold the tool, and an actuator mechanism connected to the frame which is operable to engage the bar for moving the frame therealong, wherein the bit is moved axially of the guide block member, and further wherein, in the event of a torque action caused by the stopping of the bit, the bar acts as a stop to prevent the tool from twisting in the hands of the operator.

BACKGROUND OF THE INVENTION

Field of the invention

This invention relates generally to portable power tools, and more particularly to an attachment for power tools to assist in feeding the drill bit or the like, by either pulling or pushing the tool into a workpiece.

Portable power tools and particularly portable drills are required in practically every phase of industrial and agricultural endeavor. These tools are often times bulky and heavy and require considerable effort to lift, to align with the workpiece, and to perform the desired function of the tool. In many instances, one man is not capable of performing the above tasks, thus resulting in excessive use of manpower.

In drilling a hole in a workpiece, considerable manual pressure is required to feed the bit through the workpiece. Because of the weight of the drill and the manual pressure required, many operators find it difficult to drill the hole at the exact location desired at the pressure best suited to the maximum cutting ability of the bit, and having the exact configuration desired. Many times the operator finds that, upon completion of the job, the hole is elliptical because he has, after the hole is once started, allowed the workpiece to provide part of the support, wherein the weight of the drill or uneven pressure on the handles causes the side of the bit to misshape the hole. Furthermore, if unequal pressure is exerted, the start of the hole may not be in alignment, or off-centered from the base or exit portion thereof.

In addition, operators of power tools are often faced with a tremendous torque action when the point of the drill bit either breaks through the workpiece, hits a foreign object in a workpiece, or contacts an excessively hard spot in the material being drilled. This action can create a tremendous twisting action by the drill, which must be overcome by additional operator holding pressure to prevent damage to the tool or the workpiece, or injury to the operator.

Description of the prior art

A search was conducted in Class 254, subclass 100; Class 173, subclass 141; Class 77, subclass 14; and Class 144, subclasses 105 and 34 of the files of the United States Patent Office. Several patents were found which disclose attachments for portable drills having a chain connected thereto, that are adapted to fit around a workpiece. The chain is operably connected to a rachet and pawl mechanism for drawing the drill to the workpiece. Other structures disclose jack attachments secured to a drill for pushing the drill toward the workpiece. However, these patents do not disclose a portable tool apparatus to push or pull the tool toward the workpiece. In the event the workpiece is not adapted to receive a chain, either because of its size or configuration, or if no supporting structure is available, these patents are inoperable.

It will also be noted in the prior art that the line of force is not coaxial with the drill bit, thus creating the possibility that the axis of the hole drilled thereby will be angularly inclined to the desired axis. That is, as the tool is fed to the workpiece, the force created by the off-center chain or jack, if not overcome by an equal pressure on the opposite side of the tool, will cause the axis of the tool and bit to tilt relative to the desired axis and the bit will drill into or through the workpiece at an angle to the desired direction of drilling.

In addition, as a drill bit breaks through the opposite surface of the workpiece, hits a foreign object in the workpiece, or contacts an excessively hard spot in the workpiece, a tremendous torque action results, thus twisting the drill violently. No provision has been utilized herebefore in a structure of this nature to counteract or stop this twisting action.

SUMMARY OF THE INVENTION

It is therefore an object of this invention to provide a portable tool apparatus adapted to feed the tool by either pulling or pushing same toward the workpiece.

Another object of this invention is the provision of a portable tool apparatus for either pulling or pushing the tool toward the workpiece wherein the bit is moved axially of the line of force created by the apparatus.

A further object of this invention is to provide a portable tool apparatus having a guide member adapted to receive the bit.

Yet another object of this invention is the provision of a portable tool apparatus adapted to be secured to the tool which serves as a handle for holding and supporting same.

Yet a further object of this invention is to provide a portable tool apparatus adapted to be releasably secured to the workpiece, which serves both as a stabilizer and an assembly for engaging the workpiece, and as a mechanism for drawing the drill toward the workpiece.

Still another object of the invention is the provision of an assembly adapted to prevent or stop the twisting action which is developed when the bit breaks through the opposite surface of the workpiece or when the bit contacts a foreign object or hard spot in the workpiece.

A still further object of this invention is to provide a portable tool apparatus, adapted to accomplish the objects set forth above, which is economical to manufacture, rugged in construction and extremely effective in use.

These objects, and other features and advantages of this invention will become more readily apparent upon reference to the following description when taken in conjunction with the accompanying drawing.

BRIEF DESCRIPTION OF THE DRAWINGS

FIG. 1 is a side elevational view of the apparatus attached to a portable drill;
FIG. 2 is a top plan view of the apparatus;
FIG. 3 is an end view thereof;
FIG. 4 is an enlarged, fragmentary, partially in section, side elevational view thereof.

DESCRIPTION OF THE PREFERRED EMBODIMENTS

Figure 5:
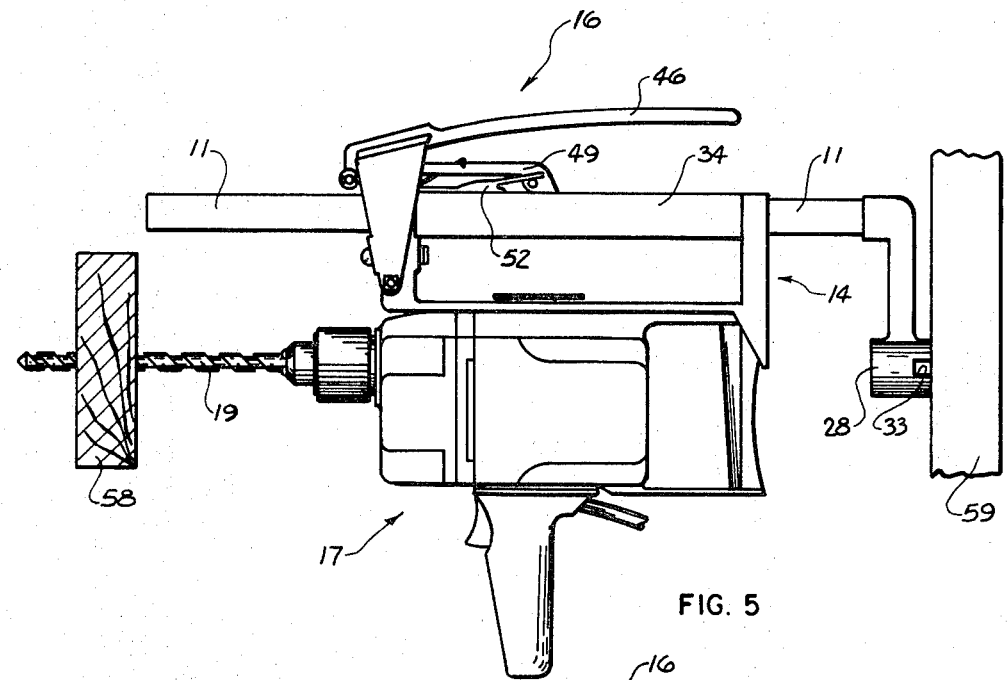
FIG. 5 is a side elevational view similar to FIG. 1, certain parts, however, being shown in alternative positions.

Referring now to the drawings, there is shown therein a preferred embodiment of this invention. In FIG. 1, the portable tool apparatus of this invention is indicated generally at 10 comprising an elongated feed bar 11 having a plurality of spaced holes 12 (FIG. 2) formed in the top thereof, a guide element 13 (FIG. 1) secured to one end of the feed bar 11 and projecting perpendicularly therefrom, a frame assembly 14 slidably mounted on the feed bar 11, and an actuator mechanism 16 connected to the assembly and operable to engage the feed bar 11 for moving the assembly therealong.

Releasably attached to the assembly 14 (FIG. 1) is a pistol grip type, portable electric drill 17. The drill 17 includes a housing 18 encompassing an electric motor (not shown), a chuck 19 secured to the driving shaft (not shown) of the motor releasably holding a drill bit 21, a pistol grip handle 22 attached to the housing, an electric cable 23 electrically connected at one end to the motor and adapted to be connected at the other end (not shown) to a source of power (not shown), a second handle 24 secured to the housing and projecting rearwardly therefrom, a tapped opening 26 disposed in the housing opposite the pistol grip handle and normally adapted to receive a third handle which projects outwardly therefrom and a trigger like switch actuator 25 for actuating the motor.

The guide element 13 comprises an L-shaped arm 27 (FIG. 1) secured, as by welding, at the end of the short leg thereof to one end of the bar 11, and a cylindrical guide block 28 fixedly secured to the end of the long leg thereof. The parallel ends 29 and 31 of the block 28, projecting outwardly from the edges of the arm 27, are normal to the rotational axis of the bit 21. A passage 32 (FIG. 3) is formed through the block 28, in axial alignment with the axis of the bit 21 and opposed slots 33 are formed in the sidewalls of block 28 at the forward end 29 thereof, as best noted in FIGS. 1 and 3, for a purpose hereinafter described.

The frame assembly 14 (FIG. 1) comprises an elongated, rectangular, hollow slideway 34, adapted to be slidably mounted on the feed bar 11 and having a slot 36 (FIG. 2) formed in the upper surface thereof. A pair of parallel, depending end braces 37 and 38 (FIG. 1) are secured to the ends of the slideway 34, the rear brace 38 having a depending, integrally formed, holding bracket 39 adapted to receive therein the upper corner of the second handle 24 for securely holding same. Secured between the braces 37 and 38 is a stringer 41 having a hole 42 formed therein for receiving a bolt 43 having a flat head 44. Upon mounting the drill 17 on the frame assembly 14, the bolt 43 is in alignment with the opening 26 and adapted to be reciprocally fastened therein.

Included in the actuator mechanism 16 (FIG. 4) is an L-shaped handle 46 pivotally secured to a bolt 47 which is fastened to the forward brace 37, wherein the free end of the handle is disposed over and substantially parallel to the slideway 34. The handle is biased by a spring (not shown) to a first position as shown in full line in FIG. 1. Pivotally secured to the handle 46 on a pivot 48 is a pawl 49. The free end of the pawl 49 is adapted to project through the slot 36 for engagement with one of the holes 12. Biasing the pawl 49 (FIG. 4) against the bar 11 is a spring 51, secured to the slideway 34. A second pawl 52 is pivotally secured on one end to the top of the slideway 34 at pin 53 with the free end thereof projecting through the slot 36 and adapted to engage another one of the holes 12. A second spring 54, secured to the pin 53, biases the free end of the second pawl 52 against the bar 11. The pawl 49 has a pin 56 projecting laterally from both sides thereof near the free end. The second pawl 49 has a bifurcated stub end 57 projecting rearwardly thereof and disposed over the pin 56.

Manual manipulation of the handle 46 (FIG. 1) from the first position to a second position (FIG. 4) causes the pawl 49 to move axially so as to slide the bar 11 axially in the slideway 34 thus pulling the drill 17 toward the block 28. As the bar 11 slides in the slideway 34, the second pawl 52 is pushed out of one of the holes 12 and biased into re-engagement with an adjacent hole 12. Upon release of the handle 46, it is biased to its first position (FIG. 1) and the pawl 49 disengages from the hole and slides to an adjacent hole 12. As the handle 46 is manipulated between the first and second position, the second pawl 52 prevents reverse motion of the bar in the slideway, and as the handle returns to its first position, the pawl 49 prevents this same reverse motion, thus one of the pawls is always in engagement with one of the holes 12.

By manually urging the handle 46 away from the slideway 34 to a third position and against the biasing action of the spring, the pawl 49 is disengaged from one of the holes 12, the second pawl 52 is disengaged from another of the holes by the lifting thereof by the pin 56 contacting and lifting the stub 57 as shown in broken line view in FIG. 4, and the bar 11 can be manually slid in either direction in the slideway 34.

In operation, the bar 11 is inserted into the slideway 34 with block 28 projecting outwardly from the bit 21. The drill is grasped at the pistol grip handle 22 by one hand and the lever 46 by the other hand and the drill is moved to a location wherein the surface 31 of the block 28 is disposed against the opposite surface of the workpiece 58. The lever is moved to its third position and the bit 21 is brought into engagement with the workpiece by manually sliding the slideway 34 along the bar 11. The lever 46 is then released, wherein it returns to its first position, the slideway is grasped by the other hand with the fingers inserted between the stringer 41 and slideway 34 and with the thumb disposed on the lever. The drill is actuated by pressing the trigger 25 and by manipulation of the lever 46, the bit 21 is pulled toward the block 28. As the bit 21 penetrates the opposite surface of the workpiece 58, it is adapted to enter the passage 32.

In the event the bit 21 binds as it breaks through the opposite surface or contacts a foreign object or hard spot, the torque resulting therefrom will cause the drill and apparatus to rotate about the axis of the bit. However, this rotation is stopped by the bar 11 upon contact thereof with the edge of the workpiece.

If the workpiece is not suitable to be disposed between the block 28 and the bit 21, the bar 11 is removed from the slideway 34 and reversed, wherein the block projects rearwardly from the drill as best shown in FIG. 5. The apparatus is now adapted to push the bit into and through the workpiece by merely disposing the block 28 against an adjacent object 59 and by repeated actuation of the lever 46.

The guide element 13 also includes a male plug 61 (FIG. 7) adapted to be inserted in the passage 32 of the block 28. A crossmember 62 is secured to the plug 61 with the ends thereof extending normal to the axis of the passage. Each end of the crossmember 62 has a hook 63 integrally formed thereon, adapted to receive a securing element such as a chain 64 or the like. The plug 61 is insertable into the block 28 wherein the crossmember 62 projects into the slots 33, thus preventing rotation of the plug 61.

Figure 6:
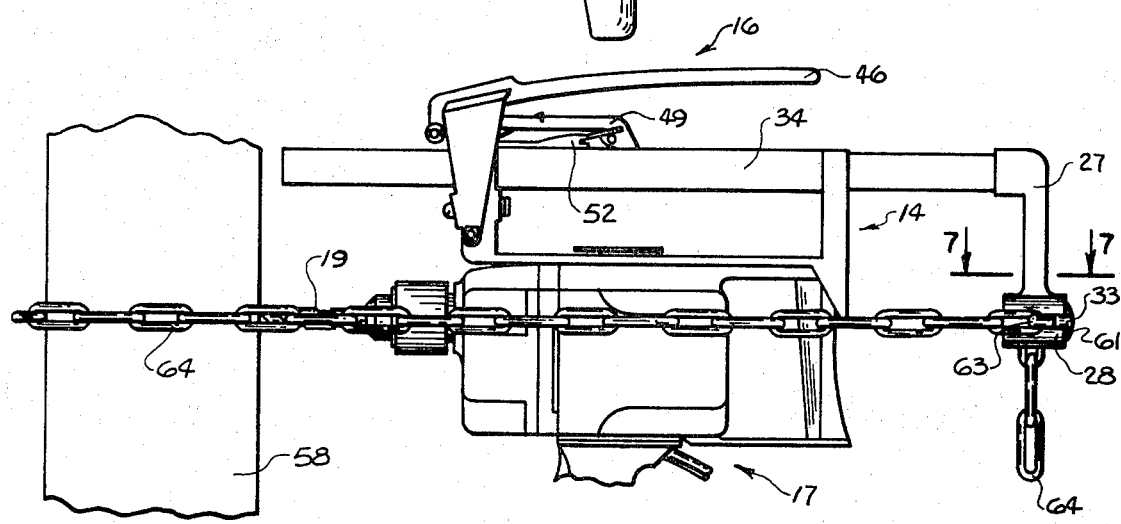
FIG. 6 is a side elevational view similar to FIG. 5 with a chain linkage secured thereto.

If the workpiece cannot be mounted between the block 28 and the bit 21 (FIG. 1) or if there is no suitable support 59 to push against (FIG. 5), the plug 61 can be inserted in the block 28 (FIG. 6), the chain 63 wrapped around the workpiece 58 and secured at suitable links to the hooks 63, thus allowing the bit 21 to be pulled into and through the workpiece by repeated manipulation of the lever 46 from a first to a second position.

Figure 7:
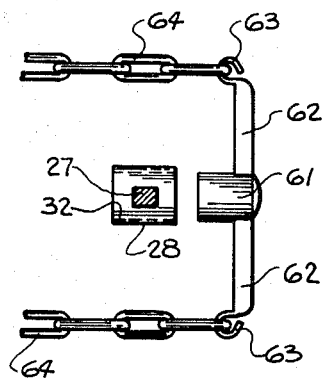
FIG. 7 is a fragmentary, exploded section taken along the line 7—7 in FIG. 6.

It will be noted in each of the proposed uses of the apparatus 10, as depicted in FIGS. 1, 5 and 7, that the bit is always moved axially of the block 28.

Although a preferred embodiment of the invention is described hereinabove, it is to be remembered that various other modifications and alternate constructions can be made thereto without departing from the true scope and spirit of the invention as defined in the appended claims.

I claim:

1. A portable drill attachment adapted to hold a drill, comprising in combination:
   a feed bar;
   a guide element secured to one end of said bar and projecting perpendicularly therefrom;
   frame means removably attached to the drill and slidably mounted on said bar in one position wherein the drill projects toward said guide element and in a second position wherein the drill projects away from said guide element;
   said guide element adapted to engage a workpiece to be drilled when said frame means is in said one position, and
   actuator means pivotally connected to said frame means and operable to engage said bar for moving said frame means therealong; said actuator means comprising a handle pivotally connected to said frame means, said handle movable from a first position to a second position;
   first engaging means pivotally secured to said handle and operable to engage said bar; second engaging means pivotally secured to said frame means and adapted to engage said bar; said handle pivotable from a first position to a second position wherein said first engaging means engages said bar and moves said frame means therealong, and said handle pivotable from said second position to said first position wherein said second engaging means engages said bar and said first engaging means disengages from said bar.

2. A portable drill attachment as defined in claim 1, wherein said guide element includes an arm secured at one end thereof to said bar and a guide block fixedly secured to the other end of said arm having an inner face and an outer face, said guide block having a passage formed therethrough in axial alignment with the axis of the drill.

3. A portable drill attachment as defined in claim 2, wherein the said guide block inner end is formed normal to the axis of the drill for bearing against the workpiece when said frame means is in said one position.

4. A portable drill attachment as defined in claim 3, wherein said guide block outer end is formed parallel to said guide block inner end for bearing against an adjacent object when said frame means is in said second position.

5. A portable drill attachment as defined in claim 3, and including further a plug adapted to be removably inserted in said passage when said guide element is disposed in said second position, a crossmember secured to said plug and disposed normal to the axis of said passage, hooks integrally formed on the ends of said crossmember, and a securing element adapted to be disposed around the workpiece and detachably mounted on said hooks, wherein said securing element is disposed in axial alignment with the drill.

6. A portable drill attachment as defined in claim 3, wherein said frame means includes a holding bracket adapted to receive one of the handles of the drill.

7. A portable drill attachment as defined in claim 6, wherein said frame means includes an elongated rectangular, hollow slideway, adapted to be slidably mounted on said bar, a pair of parallel, depending end braces secured one on each end to said slideway, said holding bracket integrally formed on the free end of one of said braces, a stringer secured between the free ends of said braces and disposed parallel to said slideway, and said stringer having an opening formed therein for receiving a bolt to secure the drill thereto.

8. A portable drill attachment as defined in claim 1 including pin means secured to said first engaging means and adapted to coact with said second engaging means upon pivoting said handle from said first position to a third position, wherein upon pivoting said handle from said first position to said third position said first engaging means is disengaged from said bar and causes said second engaging means to disengage from said bar thus allowing said frame means to be manually slid along said bar.

9. A portable drill attachment adapted to hold a drill, comprising in combination:
   a feed bar;
   a guide element secured to one end of said bar and projecting perpendicularly therefrom;
   said guide element including an arm secured at one end thereof to said bar and a guide block fixedly secured to the other end of said arm having an inner face and an outer face, said guide block having a passage formed therethrough in axial alignment with the axis of the drill;
   frame means removably attached to the drill and slidably mounted on said bar in one position wherein the drill projects toward said guide element and in a second position wherein the drill projects away from said guide element;
   said guide element adapted to engage a workpiece to be drilled when said frame means is in said one position;
   actuator means pivotally connected to said frame means and operable to engage said bar for moving said frame means therealong;
   a plug adapted to be removably inserted in said passage when said guide element is disposed in said second position;
   a crossmember secured to said plug and disposed normal to axis of said passage;
   a pair of hooks, each hook secured to one of the ends of said crossmember; and
   a securing element adapted to be disposed around the workpiece and detachably mounted on said hooks, wherein said securing element is disposed in axial alignment with the drill.

References Cited

UNITED STATES PATENTS

| | | | |
|---|---|---|---|
| 2,466,965 | 4/1949 | Pitts | 77—7 |
| 2,629,267 | 2/1953 | Hart | 77—7 |
| 2,973,673 | 3/1961 | Grau | 77—7 |

FOREIGN PATENTS 782,666   9/1957   Great Britain.

FRANCIS S. HUSAR, Primary Examiner

U.S. Cl. X.R.

77—14, 32